(12) United States Patent
Noguchi et al.

(10) Patent No.: US 12,017,292 B2
(45) Date of Patent: Jun. 25, 2024

(54) METHOD FOR MANUFACTURING HYPOID GEAR

(71) Applicant: Mazda Motor Corporation, Hiroshima (JP)

(72) Inventors: Yoshihito Noguchi, Aki-gun (JP); Ryo Takatsu, Aki-gun (JP); Isamu Ueda, Aki-gun (JP); Takeo Bandou, Aki-gun (JP); Nobuyuki Oka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 492 days.

(21) Appl. No.: 17/594,105

(22) PCT Filed: Mar. 16, 2020

(86) PCT No.: PCT/JP2020/011428
§ 371 (c)(1),
(2) Date: Oct. 1, 2021

(87) PCT Pub. No.: WO2020/203219
PCT Pub. Date: Oct. 8, 2020

(65) Prior Publication Data
US 2022/0184722 A1   Jun. 16, 2022

(30) Foreign Application Priority Data
Apr. 4, 2019   (JP) .................. 2019-071818

(51) Int. Cl.
| B23F 9/10 | (2006.01) |
| B23F 19/02 | (2006.01) |
| B23P 15/14 | (2006.01) |
| B24B 37/02 | (2012.01) |

(Continued)

(52) U.S. Cl.
CPC ............ B23F 9/10 (2013.01); B23F 19/02 (2013.01); B23P 15/14 (2013.01); B24B 37/02 (2013.01); B24C 1/10 (2013.01); B24C 11/00 (2013.01)

(58) Field of Classification Search
CPC .. B23F 9/10; B23F 19/02; B23P 15/14; B24B 37/02; B24C 1/10; B24C 11/00
See application file for complete search history.

(56) References Cited

U.S. PATENT DOCUMENTS

| 4,761,867 A * | 8/1988 | Vollmer | ............... F16H 48/08 |
| | | | 29/893.3 |
| 4,798,077 A * | 1/1989 | Douglas | ............... B21H 1/06 |
| | | | 72/354.8 |

(Continued)

FOREIGN PATENT DOCUMENTS

| JP | 2000280120 A | 10/2000 |
| JP | 2007291466 A | 11/2007 |

*Primary Examiner* — Ryan J. Walters
(74) *Attorney, Agent, or Firm* — Alleman Hall & Tuttle LLP

(57) ABSTRACT

A method for manufacturing a hypoid gear includes: a tooth cutting step of machining a shape of a tooth of the hypoid gear; a surface treatment step of forming a third intermediary gear provided with a hardened layer on a surface of the tooth; a lapping step of machining the third intermediary gear using an abrasive particle having a diameter of 14 μm or less to form a fourth intermediary gear; and a shot peening step of spraying a particle having a diameter of 160 μm or less onto the fourth intermediary gear.

19 Claims, 3 Drawing Sheets

(51) Int. Cl.
*B24C 1/10* (2006.01)
*B24C 11/00* (2006.01)

(56) References Cited

U.S. PATENT DOCUMENTS

| | | | | |
|---|---|---|---|---|
| 4,856,167 | A * | 8/1989 | Sabroff | B21K 1/30 |
| | | | | 29/893.34 |
| 4,949,456 | A * | 8/1990 | Kovach | B23P 15/14 |
| | | | | 29/DIG. 49 |
| 5,911,780 | A * | 6/1999 | Hamasaka | C21D 7/06 |
| | | | | 29/90.7 |
| 10,378,612 | B2 * | 8/2019 | Zhao | B23F 9/082 |
| 10,794,461 | B2 * | 10/2020 | Rothstein | B23F 9/04 |
| 2017/0261068 | A1 | 9/2017 | Zhao et al. | |

* cited by examiner

| GRIT NUMBER \ PARTICLE DIA. (μm) | 50 | 90 | 160 | 190 |
|---|---|---|---|---|
| #320 | — | × | × | × |
| #500 | — | × | × | × |
| #800 | ◯ | — | ◯ | — | though a hard tool and a workpiece

METHOD FOR MANUFACTURING HYPOID GEAR

TECHNICAL FIELD

The present invention relates to a method for manufacturing a hypoid gear.

BACKGROUND ART

Hypoid gears traditionally have had advantages of high durability and low tooth contact noise. Therefore, the hypoid gears have widely been put to practical use as a main component of a vehicle differential that transmits motive power.

Such a hypoid gear has a plurality of teeth simultaneously engaged when driven to rotate, and thus, a load that each tooth receives can be dispersed in the plurality of teeth. On the other hand, a contact portion (tooth contact position) between a pinion gear and a ring gear slides relatively, and thus, such a hypoid gear has the characteristics of causing energy loss to increase along with an increase in sliding friction and resulting in deterioration in mechanical efficiency as a motive power transmission mechanism.

Therefore, the hypoid gear has a lubricant film on a gear surface thereof.

As shown in FIG. 6, the hypoid gear is manufactured by a tooth cutting step S11, a heat treatment step S12, a shot peening step S13, a lapping step S14, and a lubrite process step S15. The tooth cutting step S11 machines the tooth shape of the hypoid gear. The heat treatment step S12 and the shot peening step S13 form a hardened layer on the surface of the tooth. The lapping step S14 performs machining using abrasive particles with #320 (a particle diameter of 40 μm). The lubrite process step S15 forms a lubricant film on the surface of the tooth.

The lubrite process step S15 immerses a target workpiece in a phosphate solution to form a phosphate coating on the surface thereof, and reacts this phosphate coating with lubrication (fatty acid sodium soap) to form a lubricous metallic soap.

In addition, a technique for improving fatigue strength has been proposed.

A method for manufacturing a gear of Patent Literature 1 performs a tooth cutting step, a surface treatment step to form a hardened layer, and a lapping step, and thereafter, performs a shot peening step, and a gyro grinding step instead of the lubrite process step. The shot peening improves bending fatigue strength, and the gyro grinding improves surface durability.

CITATION LIST

Patent Literature

Patent Literature 1: Japanese Patent Laid-Open No. 2000-280120

SUMMARY OF INVENTION

Technical Problem

Commonly, lapping machining that is a type of polishing machining method is classified into rough polishing, and is implemented when rough finishing is required or implemented as a preceding step prior to final polishing. Lapping machining refers to an abrasive machining method of a free abrasive particle type, in which a hard tool and a workpiece is relatively moved under a predetermined pressure with lapping compound (mixed slurry) that includes abrasive particles and a machining solution being interposed therebetween. The surface of the workpiece is finely cut by the abrasive particles and the shape of the tool is transferred to the surface of the workpiece.

Therefore, after lapping machining, striated machining marks are formed in a tooth trace direction of the hypoid gear due to pressure bonding of the abrasive particles, resulting in deterioration of tooth surface roughness of a hypoid gear.

In addition, the striated machining marks are continuously formed in the tooth trace direction, and thus, lubricant oil is exhausted outside via the machining marks when the hypoid gear is driven to rotate. As a result, an oil film fracture may occur on the tooth surface, and a sufficient motive power transmission efficiency cannot be achieved.

In order to remove the machining marks due to lapping machining, it is conceivable to provide, after the lapping machining, a plurality of shot peening steps with multiple stages in which particle diameters are gradually reduced.

However, if the plurality of shot peening steps with different particle diameters are provided, production steps are increased to make its production equipment larger and a cycle time for production longer. Providing a plurality of shot peening steps is unrealistic for mass-production of hypoid gears.

In other words, no method for manufacturing a hypoid gear that achieves both productivity and motive power transmission efficiency has been established yet.

The technique disclosed herein provides a method for manufacturing a hypoid gear capable of achieving both productivity and motive power transmission efficiency.

Solution to Problem

The technique disclosed herein is directed to a method for manufacturing a hypoid gear, and the method includes:

a tooth cutting step of machining a shape of a tooth of the hypoid gear;

a surface treatment step of forming a first intermediary body provided with a hardened layer on a surface of the tooth;

a lapping step of machining the first intermediary body using an abrasive particle having a diameter of 14 μm or less to form a second intermediary body; and a shot peening step of spraying a particle having a diameter of 160 μm or less onto the second intermediary body.

This method for manufacturing the hypoid gear includes the lapping step capable of performing fine polishing using the abrasive particle having a diameter of 14 μm or less. Therefore, it is possible to remove distortion of the shape of the tooth generated in the surface treatment step, and improve tooth surface roughness of the hypoid gear.

This method for manufacturing the hypoid gear includes the shot peening step after the lapping step. Therefore, it is possible to form a dimple capable of holding lubricant oil on the tooth surface while improving tooth surface strength.

In addition, the shot peening step is a step of spraying the particle having a diameter of 160 μm or less onto the second intermediary body that has been lapped using the abrasive particle having a diameter of 14 μm or less. Therefore, a single shot peening step can remove the striated machining marks that have been generated in the lapping step to avoid the oil film fracture on the tooth surface.

The surface treatment step may include at least one of a heat treatment step and a shot peening step of spraying a particle having a predetermined diameter.

This configuration can easily harden the tooth surface of the hypoid gear.

In the lapping step, given that a diameter of the abrasive particle is R (μm) and a rotational speed of a drive pinion is N (rpm), the following relational expression may be satisfied:

$$33,000 \leq R \times N \times 50,000$$

This configuration can substantially equalize times for performing the lapping step regardless of the sizes of the abrasive particles.

The diameter of the abrasive particle may be 14 μm, and the rotational speed of the drive pinion may be 2,400 rpm.

This configuration can secure controllability of a lapping machine used in the lapping step while removing the striated machining marks.

The hypoid gear after the shot peening step may have a tooth surface roughness of 0.8 μm or less.

This configuration can significantly reduce motive power transmission loss.

The hypoid gear may be a pinion gear or a ring gear in a differential.

This configuration can significantly reduce motive power transmission loss in a vehicle to improve fuel efficiency.

Advantageous Effect of Invention

According to the method for manufacturing the hypoid gear, performing the shot peening step capable of removing the striated machining marks after the lapping step of performing fine polishing makes it possible to achieve both productivity and motive power transmission efficiency.

DESCRIPTION OF EMBODIMENT

Hereinafter, an embodiment for implementing the present invention will be described with reference to the drawings. The following description of the preferred embodiment is merely an example in nature, and is not intended to limit the scope, applications, or use of the present invention.

Hereinafter, a first embodiment of the present invention will be described with reference to FIGS. 1 to 5.

Figure 1:
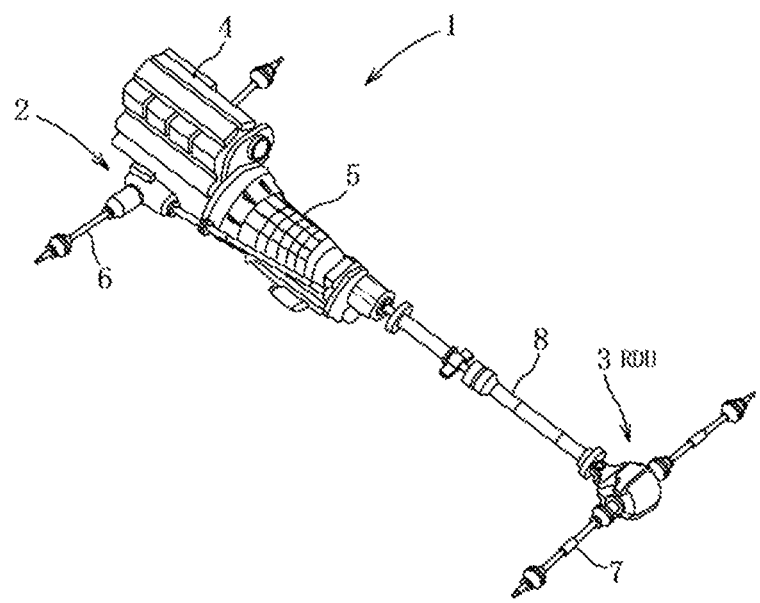
FIG. 1 is a perspective view of a power plant unit mounting an RDU (rear differential unit) including a hypoid gear according to a first embodiment.

As shown in FIG. 1, a hypoid gear 10 according to the first embodiment is a main component of a differential, specifically an FDU (front differential unit) 2 and an RDU (rear differential unit) 3, provided to a power plant unit 1 of, e.g., a four-wheel drive vehicle. The power plant unit 1 performs gear-shifting of a drive power output from an engine 4 using a transmission 5, and transmits the gear-shifted drive power to front and rear drive shafts 6 and 7 through the FDU 2 and RDU 3.

Figure 2:
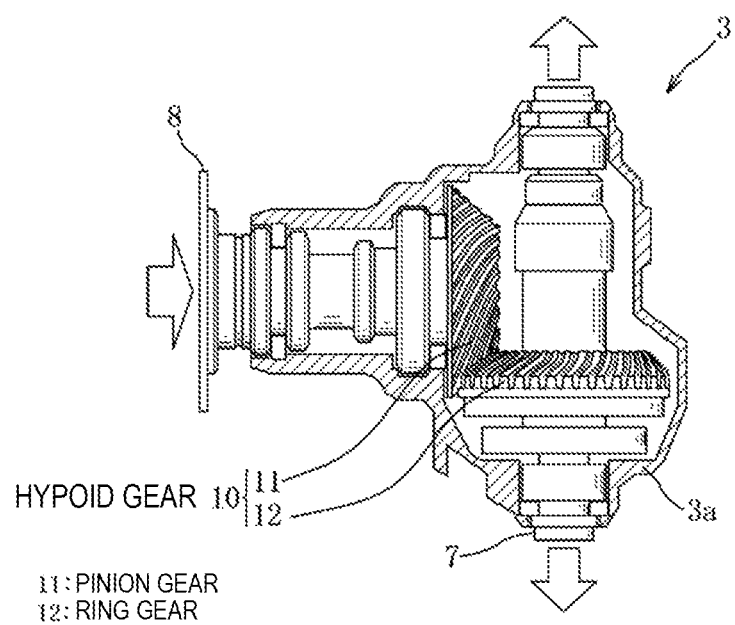
FIG. 2 is a cut-away view of the RDU.

As shown in FIG. 2, the RDU 3 includes a pinion gear 11 and a ring gear 12.

The pinion gear 11 is attached to a tip end (rear end) of a rear-side drive shaft 8 that transmits the drive power output from the transmission 5 to a downstream side. The ring gear 12 is attached to the interior of a case 3a of the RDU 3. The pinion gear 11 and the ring gear 12 are engaged together with respective rotation central axes of the pinion gear 11 and the ring gear 12 being in a torsion position, that is, not intersecting with each other and not being parallel to each other. In other words, the hypoid gear 10 includes a gear pair including the pinion gear and 11 and the ring gear 12 that are engaged together. As with the RDU 3, the FDU 2 includes a pinion gear and a ring gear (both of which are not shown) that constitute the hypoid gear.

Next, a manufacturing process of the hypoid gear 10 (11, 12) will be described on the basis of FIG. 3.

Note that Si (i=1, 2 . . . ) refers to a step indicating each process. Further, first to fifth intermediary gears 10a to 10e indicate gear pairs of intermediary bodies of the pinion gear 11 and intermediary bodies of the ring gear 12.

Figures 3, 4:
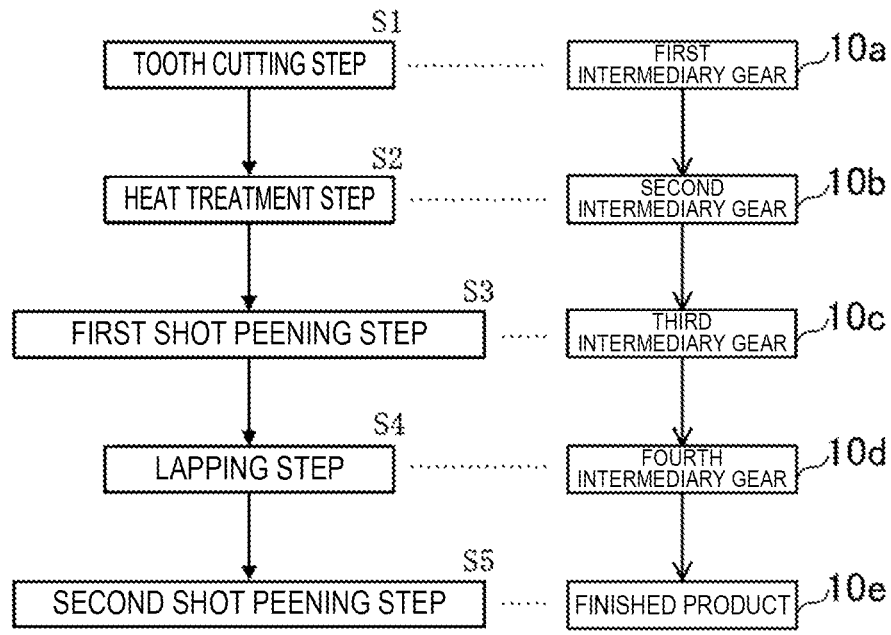
FIG. 3 is a flowchart of a method for manufacturing the hypoid gear.
FIG. 4 is a table showing a first verification result.

As shown in FIG. 3, the hypoid gear 10 is finished via a tooth cutting step S1, a heat treatment step S2, a first shot peening step S3, a lapping step S4, and a second shot peening step S5 (shot peening step). Here, the heat treatment step S2 and the first shot peening step S3 correspond to a surface treatment step of forming a hardened layer on the surface of the tooth of the hypoid gear 10.

The tooth cutting step S1 forms the shape and dimension of the tooth of the finished product on a gear material.

The gear material is alloy steel for quenching (carbon steel for machine structural use), and for example, is spherical graphite cast iron (FCD45). The tooth is cut and machined by hobbing using a hobbing machine or by tooth cutting using, e.g., a pinion cutter to form a first intermediary gear 10a from the gear material.

The tooth cutting step S1 rotates the gear material at a predetermined rate along with rotation of the hobbing machine, and at the same time, feeds the hobbing machine along a gear axis direction to perform generating tooth cutting. The hypoid gear 10 has a tooth trace that is a twisted, curved line. In the hypoid gear 10, tooth cutting is performed by generating tooth cutting using an annular cutter or by generating tooth cutting using a cone-shaped hobbing machine.

The heat treatment step S2 performs carburizing and quenching.

In the heat treatment step S2, the first intermediary gear 10a is heated at temperatures ranging, e.g., from 900 to 950° C., held for 1.5 to 4 hours, and subjected to carburizing and dispersion treatment. Thereafter, the temperature is reduced to 850° C. to be held for a predetermined time, and then, the first intermediary gear 10a is immersed into a salt bath of 200 to 250° C. for a predetermined time and subjected to quenching, thereby forming a second intermediary gear 10b. Note that it is possible to further improve compressive residual stress of the second intermediary gear 10b by, after this quenching, subjecting the second intermediary gear 10b to tempering, i.e., holding it at temperatures ranging from 130 to 170° C. for 1 to 2 hours and thereafter cooling it.

The first shot peening step S3 performs shot peening mainly for imparting compressive residual stress to the tooth surface. A shot peening device (not shown) is disposed in the position around the outer circumference of the second intermediary gear 10b. The first shot peening step S3 shoots steel ball particles toward the tooth and the bottom of the tooth with the second intermediary gear 10b being rotated around its axial center to form a third intermediary gear 10c (first intermediary body).

A shooting condition sets, for example, the average diameter of the particles to 0.1 to 1.0 mm, the hardness of the particles to 600 to 800 HV, and the shooting velocity of the particles to 50 to 100 m/sec. That is because, if the average diameter of the particles is less than 0.1 mm, the compressive residual stress is hardly imparted, and if the average diameter of the particles is more than 1.0 mm, roughness of the tooth surface is made larger. Note that the shooting velocity may be two-stage shot peening involving conventional shot of 50 to 60 m/sec and hard shot of 50 to 100 m/sec.

The lapping step S4 performs lapping machining using a lapping machine (not shown).

This lapping step S4 removes, using fine abrasive particles having an average diameter of 14 μm or less, quenching distortion of the third intermediary gear 10c after carburizing and quenching, and performs fine polishing machining to smooth engagement of the pinion gear and ring gear of the third intermediary gear 10c, thereby forming a fourth intermediary gear 10d (second intermediary body). That is because, if abrasive particles having an average diameter of more than 14 μm are used, it is difficult to remove the striated machining marks in the second shot peening step S5, and therefore, another fine polishing machining step is required in the post-process.

The lapping machine includes, for example: a pinion gear holding means rotatably holding the pinion gear (drive pinion) of the third intermediary gear 10c; a ring gear holding means disposed such that its rotary axis intersects with the rotary axis of the pinion gear of the third intermediary gear 10c and rotatably holding the ring gear; a ring gear moving means capable of moving the ring gear holding means on a base in back-forth, right-left, and up-down directions; a pinion gear moving means capable of swinging the pinion gear holding means around the swing center in a horizontal direction on the base; a supply means supplying the lapping compound including the abrasive particles and the machining solution to the engaged tooth surface of the third intermediary gear 10c; and a control means (all of which are not shown). The structure of the lapping machine is well-known, and thus, its detailed description will be omitted.

The control means performs lapping machining on the basis of machining conditions such as the rotational speed (rpm) and transmission torque of the pinion gear, a swing amplitude, a cycle number, and a cycle time. One cycle is a movement stroke from the start of reciprocation (oscillation) of a tooth contact portion of the third intermediary gear 10c on the entire tooth width along the tooth trace direction by the operation of the lapping machine to return to the original position, and the cycle time is a time required for carrying out the set cycle number.

In order to substantially equalize times required for performing the lapping step S4 regardless of the sizes of the abrasive particles, given that the diameter of the abrasive particle is R (μm) and the rotational speed of the pinion gear is N (rpm), the relationship of the following equation is satisfied.

$$33{,}000 \leq R \times N \leq 50{,}000 \quad (1)$$

That is because, if R×N is less than 33,000, mass productivity cannot be secured, and if the relationship is more than 50,000, machining precision cannot be secured. In the present embodiment, the average diameter of the abrasive particles is set to 14 μm, the rotational speed is set to 2,400 rpm, and the transmission torque is set to 1.0 kgm. This secures substantially the same amount of machining as that in lapping machining under a condition in which the average diameter of the abrasive particle is 40 μm, the rotational speed is 1,200 rpm, and the transmission torture is 1.0 kgm.

The second shot peening step S5 performs shot peening using steel ball particles having an average diameter of 160 μm or less to obtain the finished product of the hypoid gear 10.

The pinion gear and ring gear of the fourth intermediary gear 10d have striated machining marks extending along the tooth trace direction due to pressure bonding of the abrasive particles in the lapping step S4. The second shot peening step S5 has the main object of removing the machining marks generated in the lapping step S4.

If the steel ball particles have an average diameter of more than 160 μm, it is difficult to suppress the tooth surface roughness to 0.8 μm, and in addition, it is impossible to sufficiently achieve a lubricant holding function that holds the lubricant oil in a dimple (recess) formed by shot peening. In the present embodiment, the average diameter of the steel ball particles is set to 160 μm.

Next, operations and effects of the method for manufacturing the hypoid gear will be described.

First and second verifications were carried out to describe the operations and effects.

The first verification confirmed the striated machining marks formed in the hypoid gear.

The verification order was as follows: shot peening of the intermediary bodies of the hypoid gear that each had been lapped using respective #320, #500, and #800 abrasive particles were performed using four types of steel balls having different particle diameters (50 μm, 90 μm, 160 μm, and 190 μm), and presence or absence of the striated machining marks after each shot peening was confirmed. Note that process conditions were the same, except for the diameters of the abrasive particles, i.e., #320 had an average diameter of 40 μm, #500 had an average diameter of 25 μm, and #800 had an average diameter of 14 μm.

As shown in the verification result of FIG. 4, if lapping machining using #320 and #500 abrasive particles were performed, the machining marks formed on the hypoid gear were large, and the steel balls having any particle diameter had difficulty in removing the machining marks. In contrast, if lapping machining using #800 abrasive particles was performed, shot peening using the steel balls having an average diameter 50 μm and 160 μm removed the machining marks.

From the above result, it was at least confirmed that, if lapping machining was performed using the abrasive particles having an average diameter of 14 μm, shot peening using the steel balls having an average diameter of 160 μm or less could remove the striated machining marks. Note that, in terms of productivity such as manufacturing tolerance, the steel ball particles having an average diameter of 160 μm are higher than the steel ball particles having an average diameter of 50 μm in supply stability.

In the second verification, three hypoid gears A to C were manufactured by different manufacturing methods and different manufacturing steps, and respective mesh friction losses (%) of the gears were compared.

The hypoid gear A was manufactured by a manufacturing method similar to that of the present embodiment, except that the abrasive particles in the lapping step was #320 (average diameter of 40 μm), the second shot peening step was omitted, and a lubrite process step was performed. The hypoid gear B was manufactured by a manufacturing method similar to that of the present embodiment, except that the steel ball particles had an average diameter of 50 μm in the second shot peening step. The hypoid gear C was a finished product manufactured by the manufacturing method of the present embodiment.

Figure 5:
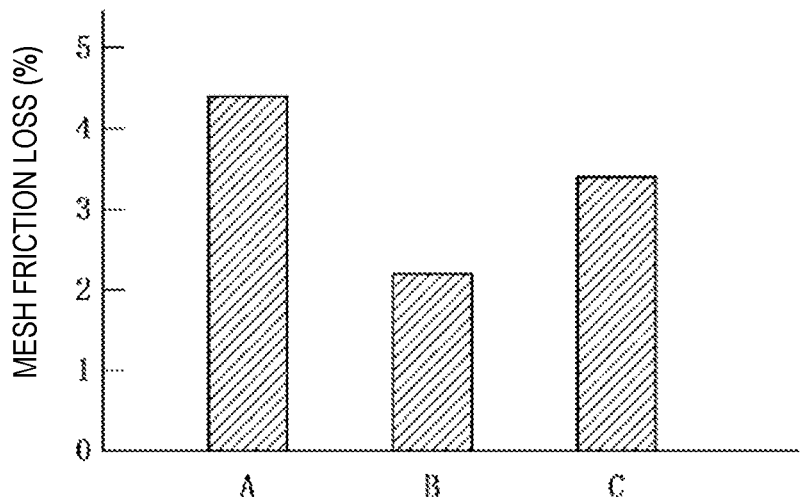
FIG. 5 is a table showing a second verification result.
Figure 6:
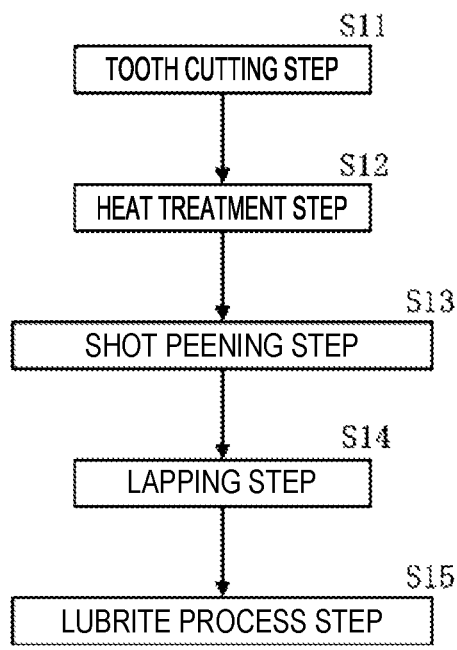
FIG. 6 is a flowchart of a traditional method for manufacturing a hypoid gear.

FIG. 5 shows the verification result.

As shown in FIG. 5, the hypoid gear A had a tooth surface roughness of 0.98 μm, and a mesh friction loss of 4.4%. The hypoid gear A had striated machining marks.

The hypoid gears B and C each had a tooth surface roughness of 0.8 μm or less, and respectively had a mesh friction loss of 2.2% and a mesh friction loss of 3.4%. No striated machining marks existed in the hypoid gears B and C. This confirmed that, if the steel ball particles in the second shot peening step had an average diameter of 160 μm or less, the mesh friction loss was improved. This further confirmed that the mesh friction loss was more improved as the average diameter decreases.

The manufacturing method includes the lapping step S4 capable of performing fine polishing using the abrasive particles having a diameter of 14 μm or less. This can remove the distortion of the shape of the tooth generated in the heat treatment step S2 and the first shot peening step S3, and improve the tooth surface roughness of the hypoid gear 10.

The manufacturing method includes the second shot peening step S5 after the lapping step S4. This makes it possible to form a dimple capable of holding lubricant oil on the tooth surface while improving tooth surface strength.

Further, the second shot peening step S5 sprays particles having a diameter of 160 μm or less onto the fourth intermediary gear 10d that has been lapped using the abrasive particles having a diameter of 14 μm or less. Therefore, a single second shot peening step S5 can remove the striated machining marks that have been generated in the lapping step S4 to avoid the oil film fracture on the tooth surface.

The surface treatment step includes the heat treatment step S2 and the first shot peening step S3 of spraying particles having a predetermined diameter, and the surface treatment step can thus easily harden the tooth surface of the hypoid gear 10.

In the lapping step S4, if the diameter of the abrasive particles is R (μm) and the rotational speed of the drive pinion is N (rpm), Equation (1) is satisfied, and therefore, the times for performing the lapping step S4 can substantially be equalized regardless of the sizes of the abrasive particles.

Since the diameter of the abrasive particle is 14 μm and the rotational speed of the drive pinion is 2,400 rpm, controllability of the lapping machine used in the lapping step S4 can be secured while removing the striated machining marks.

The hypoid gear 10 after the second shot peening step S5 has a tooth surface roughness of 0.8 μm or less, thereby making it possible to significantly reduce motive power transmission loss.

The hypoid gear 10 is the pinion gear 11 and ring gear 12 of the RDU 3, thereby making it possible to reduce motive power transmission loss in a vehicle to improve fuel efficiency.

Next, modifications that are partial modifications of the above embodiment will be described.

1) In the above embodiment, the example of the hypoid gear 10 used for a differential of a four-wheel drive vehicle is described. The invention may be applied to only one of the hypoid gear of the FDU 2 and the hypoid gear of the RDU 3. In addition, the invention may be applied to a differential of a two-wheel drive vehicle, and also be applied to, in addition to vehicles, any mechanism as long as it is a motive power transmission mechanism required to have durability.

2) In the above embodiment, the example of performing the heat treatment step S2 and the first shot peening step S3 prior to the lapping step S4 is described. At least, following the lapping step S4, the single second shot peening step S5 may be successively performed, and only one of the heat treatment step S2 and the first shot peening step S3 may be performed prior to the lapping step S4. The condition for performing the heat treatment step S2 and the first shot peening step S3 is not limited to the specification described, and may be set as appropriate.

3) Further, those skilled in the art can practice the invention in a form of an embodiment to which various changes are added and in a form of combinations of the respective embodiments without departing from the scope of the invention, and the present invention includes such modified embodiments.

REFERENCE CHARACTER LIST

3 RDU
10 Hypoid Gear
11 Pinion Gear
12 Ring Gear
S1 Tooth Cutting Step
S2 Heat Treatment Step
S3 First Shot Peening Step
S4 Lapping Step
S5 Second Shot Peening Step

The invention claimed is:

1. A method for manufacturing a hypoid gear, the method comprising:
   a tooth cutting step of machining a shape of a tooth of the hypoid gear;
   a surface treatment step of forming a first intermediary body provided with a hardened layer on a surface of the tooth;
   a lapping step of machining the first intermediary body using an abrasive particle having a diameter of 14 μm or less to form a second intermediary body; and
   a shot peening step of spraying a particle having a diameter of 160 μm or less onto the second intermediary body.

2. The method for manufacturing the hypoid gear according to claim 1, wherein the surface treatment step includes at least one of a heat treatment step and a shot peening step of spraying a particle having a predetermined diameter.

3. The method for manufacturing the hypoid gear according to claim 2, wherein in the lapping step, given that a diameter of the abrasive particle is R (μm) and a rotational speed of a drive pinion is N (rpm), the following relational expression is satisfied:

$$33,000 \leq R \times N \leq 50,000.$$

4. The method for manufacturing the hypoid gear according to claim 3, wherein the diameter of the abrasive particle is 14 μm, and the rotational speed of the drive pinion is 2,400 rpm.

5. The method for manufacturing the hypoid gear according to claim 4, wherein the hypoid gear after the shot peening step has a surface roughness of 0.8 μm or less.

6. The method for manufacturing the hypoid gear according to claim 5, wherein the hypoid gear is a pinion gear or a ring gear in a differential.

7. The method for manufacturing the hypoid gear according to claim 4, wherein the hypoid gear is a pinion gear or a ring gear in a differential.

8. The method for manufacturing the hypoid gear according to claim 3, wherein the hypoid gear after the shot peening step has a surface roughness of 0.8 μm or less.

9. The method for manufacturing the hypoid gear according to claim 3, wherein the hypoid gear is a pinion gear or a ring gear in a differential.

10. The method for manufacturing the hypoid gear according to claim 2, wherein the hypoid gear after the shot peening step has a surface roughness of 0.8 μm or less.

11. The method for manufacturing the hypoid gear according to claim 2, wherein the hypoid gear is a pinion gear or a ring gear in a differential.

12. The method for manufacturing the hypoid gear according to claim 1, wherein in the lapping step, if a diameter of the abrasive particle is R (μm) and a rotational speed of a drive pinion is N (rpm), the following relational expression is satisfied:

$$33{,}000 \leq R \times N \leq 50{,}000.$$

13. The method for manufacturing the hypoid gear according to claim 12, wherein the diameter of the abrasive particle is 14 μm, and the rotational speed of the drive pinion is 2,400 rpm.

14. The method for manufacturing the hypoid gear according to claim 12, wherein the hypoid gear after the shot peening step has a surface roughness of 0.8 μm or less.

15. The method for manufacturing the hypoid gear according to claim 12, wherein the hypoid gear is a pinion gear or a ring gear in a differential.

16. The method for manufacturing the hypoid gear according to claim 1, wherein the hypoid gear after the shot peening step has a surface roughness of 0.8 μm or less.

17. The method for manufacturing the hypoid gear according to claim 16, wherein the hypoid gear is a pinion gear or a ring gear in a differential.

18. The method for manufacturing the hypoid gear according to claim 1, wherein the hypoid gear is a pinion gear or a ring gear in a differential.

19. The hypoid gear of claim 1, wherein the first intermediary body and the second intermediary body are gear pairs of intermediary bodies of the pinion gear of a rear differential unit and the intermediary bodies of the ring gear of the rear differential unit respectively.

* * * * *